(12) United States Patent  (10) Patent No.: US 7,109,679 B2
Edson et al.  (45) Date of Patent: Sep. 19, 2006

(54) DAMPING FOR ELECTROMECHANICAL ACTUATORS

(75) Inventors: Ralph D. Edson, Saugus, CA (US); M. Robert Mock, Moorpark, CA (US)

(73) Assignee: HR Textron, Inc., Santa Clarita, CA (US)

( * ) Notice: Subject to any disclaimer, the term of this patent is extended or adjusted under 35 U.S.C. 154(b) by 129 days.

(21) Appl. No.: 10/797,787

(22) Filed: Mar. 9, 2004

(65) Prior Publication Data

US 2005/0200328 A1    Sep. 15, 2005

(51) Int. Cl.
 *G05B 5/01*    (2006.01)
(52) U.S. Cl. .................................... 318/611; 318/623
(58) Field of Classification Search ............... 318/560, 318/561, 566, 568.22, 611, 615, 619, 621, 318/623, 632, 650–653
See application file for complete search history.

(56) References Cited

U.S. PATENT DOCUMENTS

| 3,569,718 | A | * | 3/1971 | Borner ..................... 250/548 |
| 3,579,071 | A | * | 5/1971 | Drescher et al. ............ 318/603 |
| 4,267,496 | A |   | 5/1981 | Ivanov et al. |
| 4,313,364 | A |   | 2/1982 | Blincoe et al. |
| 5,184,049 | A |   | 2/1993 | Kiuchi ..................... 318/363 |
| 5,545,957 | A |   | 8/1996 | Kubo et al. ................ 318/432 |
| 5,650,704 | A |   | 7/1997 | Pratt et al. |
| 5,726,542 | A | * | 3/1998 | Ebihara ..................... 318/35 |
| 5,757,160 | A | * | 5/1998 | Kreuzer ..................... 318/649 |
| 5,886,491 | A |   | 3/1999 | Yoshida et al. ............ 318/592 |

(Continued)

FOREIGN PATENT DOCUMENTS

DE    103 13 604 A1    3/2003

(Continued)

OTHER PUBLICATIONS

HR Textron, Airforce-Technology.com, Advanced EMA Controls, Precision Strike, WInning in the Air, 4 pages, printed on Dec. 10, 2003.

(Continued)

*Primary Examiner*—Bentsu Ro
(74) *Attorney, Agent, or Firm*—BainwoodHuang; David E. Huang, Esq.

(57) ABSTRACT

Oscillation and other disturbance damping is provided for a system having a load driven by an electric motor, e.g., an electromagnetic actuator. Damping is achieved using feedback in an active mode, where power is supplied in a normal operation mode of the electromagnetic actuator. Feedback may be provided by measured force (or torque) transmitted between the actuator and load mass. A gear train or other mechanical advantage device may be connected between the electromagnetic actuator output and load, this combination forming an electromechanical actuator (EMA). Instead of force or torque, acceleration of the load may be used as a feedback signal. In one embodiment, active mode damping uses the motor's actual current as a feedback signal. In certain or all active damping versions of the invention, a high pass filter is preferably used to receive feedback signals and filter out low frequency feedback. Alternatively, damping is achieved in an inactive (passive) mode of motor operation, e.g., where the electric motor is not receiving power drive signals. The motor coils are shorted, e.g., using a switch. The induced motor currents act to inhibit load oscillations. Preferably, a resistance, e.g., a number of resistors, are in the short circuit to tailor the damping characteristics of the motor. In at least the active current feedback and passive modes of operation, inertia of the electric motor is substantially reduced in relation to typical motor inertia, by changing the stator to rotor diameter ratio from a typical ratio of at or about 2:1 or less, to a substantially higher ratio than 2:1.

24 Claims, 12 Drawing Sheets

U.S. PATENT DOCUMENTS

| | | | |
|---|---|---|---|
| 5,894,862 A | 4/1999 | Ogilvie | |
| 5,973,467 A * | 10/1999 | Eguchi | 318/609 |
| 6,003,481 A | 12/1999 | Pischinger et al. | |
| 6,029,959 A * | 2/2000 | Gran et al. | 267/136 |
| 6,034,493 A | 3/2000 | Boyd et al. | |
| 6,122,579 A * | 9/2000 | Collier-Hallman et al. | 701/41 |
| 6,247,687 B1 | 6/2001 | Jensen et al. | |
| 6,279,524 B1 | 8/2001 | Schebitz | |
| 6,281,643 B1 * | 8/2001 | Ebihara | 318/35 |
| 6,290,038 B1 | 9/2001 | Jensen et al. | |
| 6,373,207 B1 | 4/2002 | Yablonovitch | |
| 6,650,079 B1 * | 11/2003 | Binnard | 318/649 |
| 6,720,746 B1 * | 4/2004 | Amann et al. | 318/114 |
| 6,832,119 B1 * | 12/2004 | Miller | 700/45 |
| 2002/0088678 A1 | 7/2002 | Ruckman et al. | |

FOREIGN PATENT DOCUMENTS

| | | |
|---|---|---|
| EP | 0 658 970 A1 | 6/1995 |
| EP | 0 733 578 A2 | 9/1996 |
| EP | 0 845 854 A1 | 6/1998 |
| EP | 1 120 698 A1 | 8/2001 |
| JP | 2001178182 | 6/2001 |

OTHER PUBLICATIONS

David W. Robinson and Gill A. Pratt, Force Controllable Hydro-Elastic Actuator, MIT Leg Laboratory, 7 pages, Cambridge, MA.

Gill A. Pratt and Matthew M. Williamson, Series Elastic Acutators, MIT Artificial Intelligence Laboratory and Laboratory for Computer Science, pp. 399-406, Apr. 1995.

Michael Zinn, Oussama Khatib, Bernard Roth and J. Kinneth Salisbury, Actuation Methods For Human-Centered Robotics and Associated Control Challenges, 16 pages.

* cited by examiner

DAMPING FOR ELECTROMECHANICAL ACTUATORS

BACKGROUND OF THE INVENTION

1. Field of the Invention

The present invention relates to oscillation damping in systems having electric motors for moving and positioning a load, such as a nose wheel of an airborne vehicle.

2. Description of the Related Art

For a long time, hydraulic systems have been used to move and position various components of aircraft and other vehicles and devices. One application of hydraulics has been in aircraft nose wheel steering (moving the aircraft's front wheel to a desired angular position). Nose wheels, like many other components, can be subject to shimmy or oscillation. These oscillations, particularly when at or near the resonant frequency, can cause damage to system components, reduce their life, weaken control and hinder accuracy. Accordingly, it is desirable to dampen vibrations of the load. Damping is often achieved when hydraulic power is used by forcing hydraulic fluid through an orifice.

It is desirable to use electric motors and in particular electromechanical actuators (EMAs) to move a nose wheel or other load. EMAs have no hydraulic fluid, so another form of damping is required. Unlike hydraulic actuators, EMAs intrinsically require a power train with a large gear ratio to deliver to the load the force (or torque) required by many applications, such as a steering actuator. It has been found that such a high gear ratio causes the system to be generally unresponsive to damping. In addition, conventional wisdom is that the requirement of power typically results in use of an electric motor with a stator diameter to rotor diameter ratio of equal to or about 2 to 1 or less.

One example of how damping has been attempted involves placing elastomeric damping elements in selected positions on the nose wheel assembly, such as in U.S. Pat. No. 6,247,687.

Oscillation damping with an electric motor such as in an EMA may be needed in nose wheel steering on an aircraft, such as a commercial aircraft, in shimmy damping of any vehicle steered with EMA or an electric motor, and any other electric motor or EMA actuation system for a load where load damping is used or required.

SUMMARY OF THE INVENTION

In one embodiment, vibration damping is provided for a system having a load driven by an electric motor, e.g., an EMA.

In a first preferred embodiment, oscillation damping is achieved using feedback in an active mode, where the actuator functions in a normal operation mode of the motor.

In a first version of this preferred embodiment, feedback is provided by measured force (or torque) transmitted between the load mass and actuator. A gear train or other mechanical advantage device may be connected between the actuator output and the load.

A variation of the first version is to measure acceleration of the load as a feedback signal, using e.g., an accelerometer.

A second version of the first embodiment of active mode damping uses the measurement of the motor's actual current as a feedback signal.

In certain active damping versions of the invention, a high pass filter may be used to pass on the high frequency portion of the feedback signals and filter out low frequency feedback.

In a second preferred embodiment, damping is achieved in an inactive (passive) mode of motor operation, e.g., where the electric motor is not receiving power (electrical drive signals). In this state, the motor is purposely shorted, e.g., using a switch. Load torques or forces, e.g. load shimmy, cause motor motion which produces short circuit motor currents. These currents produce reacting forces which provide actuator damping. Preferably, a resistance, e.g., a number of resistors, are in the short circuit to tailor the damping characteristics of the motor.

In accordance with a further aspect of the invention for the first and/or second embodiments, the inertia of the electric motor is substantially reduced in relation to typical motor inertia, by reducing the stator to rotor diameter ratio from a typical ratio of at or about 2:1 or less, to a substantially higher ratio than 2:1, e.g., from at or about 2.75:1, 3:1, 4:1, or 5:1 to as much as at or about 10:1, or more where possible. This low inertia motor is especially preferred for the current feedback version of the first embodiment of active damping, and also especially preferred for the second embodiment of passive damping.

A preferred embodiment of the invention includes moving a load using an EMA, and using the EMA to provide damping. The load is preferably a caster style wheel or fork mounted wheel for a vehicle, such as the front or nose wheel for a vehicle, such as an air vehicle, which is susceptible to shimmy.

DESCRIPTION OF THE PREFERRED EMBODIMENT(S)

Figure 1:
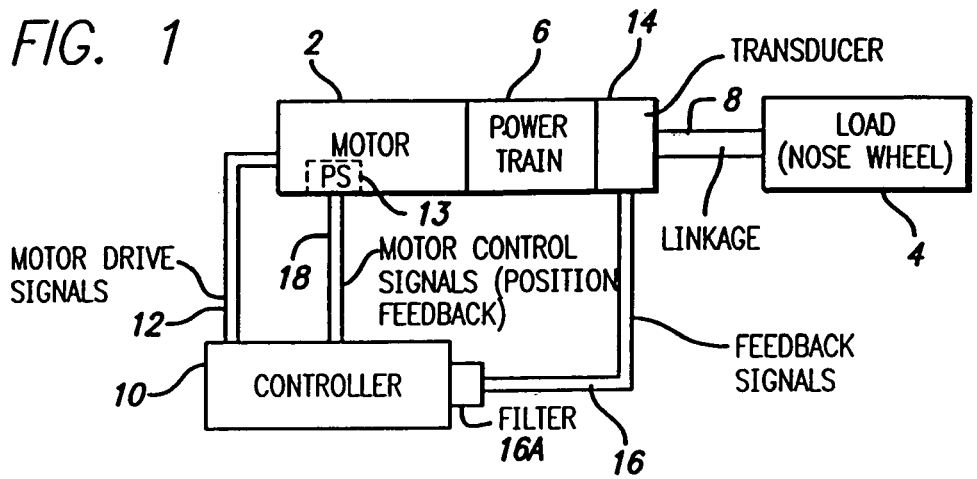
FIG. 1 is a schematic view of a load control system, such as for controlling a nose wheel of an aircraft, using an electric motor (electromagnetic actuator) and feedback for active mode vibration damping in accordance with a first embodiment of the invention where torque or acceleration are fed back.

In a first embodiment of the invention, a steering control system for a load, e.g., an aircraft nose wheel uses an electric motor. Specifically, as shown in FIG. 1, a steering control system includes an electric motor 2 for moving a load 4 via a power train 6 and mechanical linkage 8. As is well known in the art, power train 6 typically ends in an output shaft (not shown) by which linkage 8 may connect to the power train 6.

A controller 10 sends motor drive signals 12 to motor 2 so that load 4 is driven to a desired position. A position sensor (PS) 13 senses position of load 4, e.g., by sensing the position of part of the motor or the motor output shaft as may be done in a typical servo motor. As is also typical, the position signals are used as motor control signals 18 which provide position feedback to a controller 10. If load 4 moves from the desired position, controller 10 is programmed to send motor drive signals 12 as necessary to move load 4 back to the desired position. The motor drive signals typically are a voltage.

A transducer 14 measures load torque or force and sends feedback signals 16 back to controller 10 to drive motor 2 in a fashion that compensates for undesirable load oscillations, such as shimmy, and also maintains the desired position.

This system functions as a typical servo system which adjusts the motor drive signals 12 as needed to keep moving load 4 to the desired position as shimmy or disturbances occur. Electric motor 2 may be (or may be known as) a DC motor, a DC brushless motor, a synchronous motor, or the like, used as in an actuator.

Power train 6 may be a gear train. Controller 10 may be a microprocessor, computer, PLC, an analog electric control circuit or the like. Load 4 may be any movable object that experiences shimmy or otherwise may need load damping. One application where shimmy is a serious problem is in the nose wheel of an aircraft during takeoff, landing, and taxi. Accordingly, load 4 may be an aircraft nose wheel. In such an application, linkage 8 provides a connection from the output shaft of gear train 6 to the nose wheel, by any of various well known support structure to which the wheel axle is mounted, e.g., such as shown in U.S. Pat. No. 6,247,687. However, using the invention of the present inventors as described herein, elastomeric damping elements of U.S. Pat. No. 6,247,687 need not be used. Accordingly, linkage 8 may be relatively stiff, e.g., made of nonelastic, nondeformable members, e.g., of metal.

In an aircraft, because of the magnitude of the load, an electric motor would not normally be used. In accordance with the invention, to provide sufficient power to steer the nose wheel or control other such loads, the power train gear ratio is preferably high, e.g., at least 50 to 1, or more preferably at least 100 to 1, and most preferably 147 to 1.

In accordance with the first embodiment of the invention, a transducer 14 is used to measure force or torque transmitted between the electric motor 2 and the load mass, which would include load 4 and linkage 8. This transducer 14 would be positioned, e.g., at the output shaft of power train 6, so as to measure a force representative of that applied to the load. The feedback signals 16 (the measured force signals from transducer 14) would be fed back to controller 10. Similarly, the acceleration of the load mass may be measured using an accelerometer or the like as transducer 14, and feeding back the measured acceleration by signals 16 to controller 10 to achieve the same result.

The first embodiment may be varied by sensing and feeding back torque. In such case, transducer 14 senses torque.

Figure 1A:
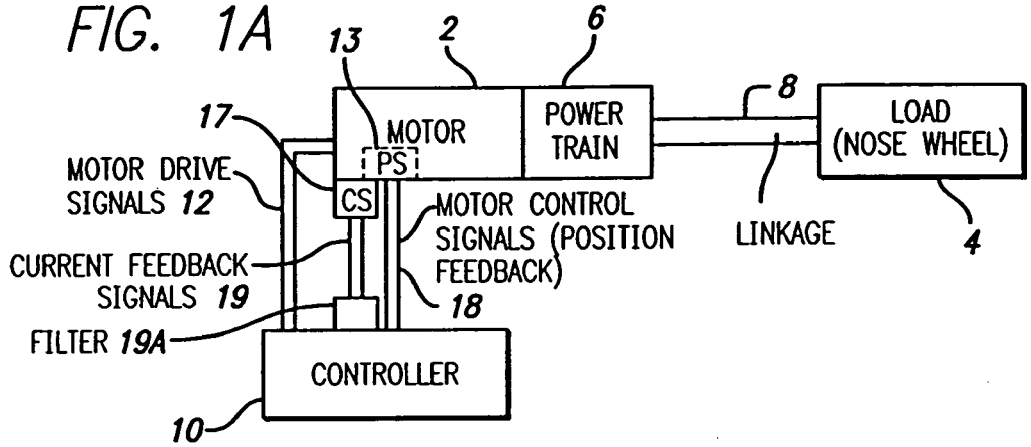
FIG. 1A is a schematic view similar to FIG. 1, showing a variation of the first embodiment where current is fed back.

Another embodiment is shown in FIG. 1A, which is similar to the embodiment of FIG. 1, except that in FIG. 1A, a current sensor 17 (labeled "CS" in FIG. 1A) measures and feeds back a current measurement signal to controller 10 by current feedback signals 19. In such an embodiment, it is also preferred to use a motor with an overall stator diameter to rotor diameter ratio ("stator to rotor ratio") of greater than 2:1. That is, the rotor diameter is decreased to below typical conventional servo motors of at or about 2:1 or smaller. Such servo motors, especially of the permanent magnet brushless DC type, are typically designed for high acceleration, efficiency and power to weight ratio. To achieve a typical desired balance of such characteristics, all or nearly all servo motors have a stator to rotor ratio of at or about 2:1 or less.

In accordance with one aspect of the invention, increase of the stator to rotor ratio above or substantially above at or about 2:1 is preferred, even though the efficiency and power to weight ratio are degraded for such a motor.

Figure 4:
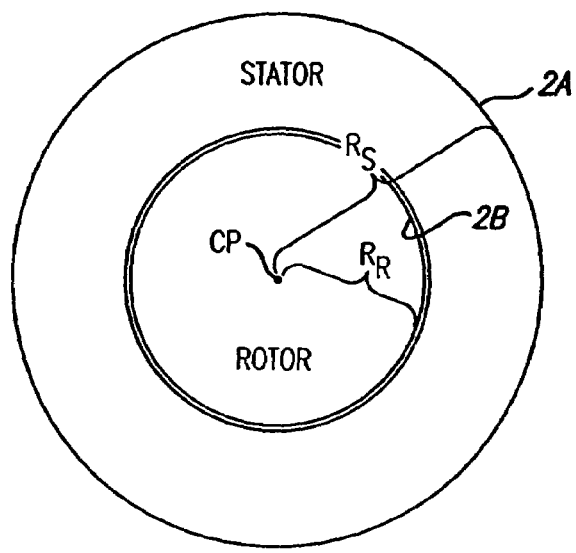
FIG. 4 is a schematic diagram of an electric motor showing a first relative size of a rotor radius (or diameter) in relation to a stator radius (or diameter) in a typical electric motor.
Figure 5:
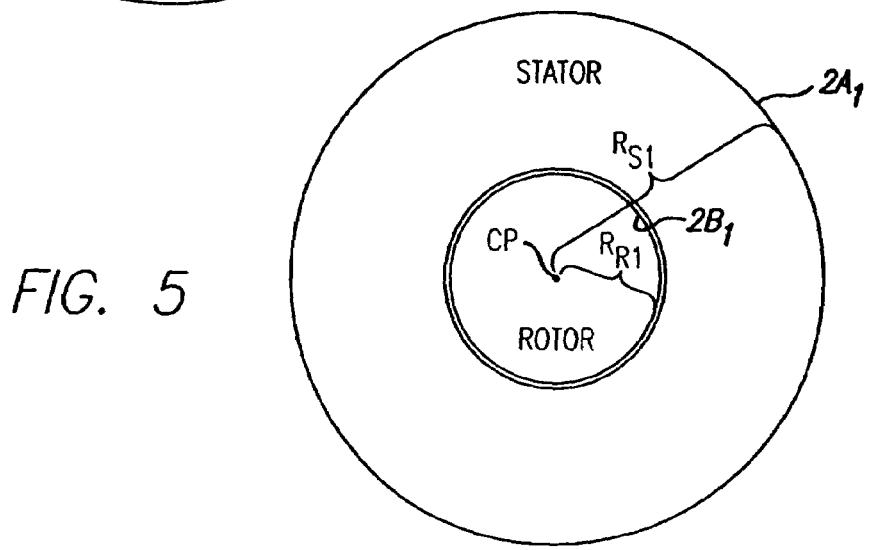
FIG. 5 is a schematic diagram similar to FIG. 4 and showing a reduced rotor radius (or diameter) in relation to the stator radius (or diameter) in an electric motor for use in a preferred embodiment of the invention, such as in FIGS. 1, 1A or 2–3.

FIG. 4 is a diagram showing a typical stator 2A and rotor 2B relative radii (or diameter). That is, stator radius $R_s$ in relation to rotor radius $R_R$ is typically at or about 2:1. In the preferred embodiment, as shown in FIG. 5, stator $2A_1$ and rotor $2B_1$ have radii of $R_{R1}$ and $R_{S1}$, in a ratio increased substantially above 2:1, e.g., at or about 3:1, 4:1, or 5:1 to at or about 10:1 or more.

In the embodiment of FIG. 1A, current feedback is used instead of torque or acceleration feedback. Accordingly, in place of transducer 14 and feedback signals 16 of FIG. 1, FIG. 1A shows a current sensor (CS) 17 sending current feedback signals 19 to controller 10, by sensing current in the motor 2. It is also possible to connect the wires to put the current sensor 17 in controller 10.

A high pass filter 16A may also be placed in or at controller 10 to filter feedback signals 16. The high pass filter removes or minimizes the influence of lower frequency feedback signals, passing frequencies at or near and above the frequencies of the undesirable oscillations or shimmy. In FIG. 1A, a high pass filter 19A filters current feedback signals 19. The low frequency signals are blocked to avoid degrading low-frequency loop stiffness, which helps maintain the static positioning accuracy of the position control (servo) loop.

In another embodiment of the invention, there is a passive or inactive damping of shimmy and other disturbances to the wheel or load movement. In the inactive mode, there is no feedback. To achieve inactive damping, the rotor diameter is reduced in relation to the typical stator to rotor diameter ratio of at or about 2:1. Reductions in rotor diameter relative to stator diameter increase the diameter ratio from at or about 3:1 to at or about 10:1 or even more, with at or about 3.5:1 being preferred for some systems. The reduction of relative rotor diameter dramatically reduces motor inertia and makes the motor more responsive to shimmy damping in the passive mode.

A passive energy dissipative element is also added to the system of FIG. 1 or FIG. 1A to improve damping in the event of power failure or the like. Preferably, in response to power shut off, the coils of the motor are shorted, either partially or fully, and in a further preferred embodiment, energy dissipating resistors are placed in the electrical path of the short circuit, to tailor damping characteristics.

Figure 2:
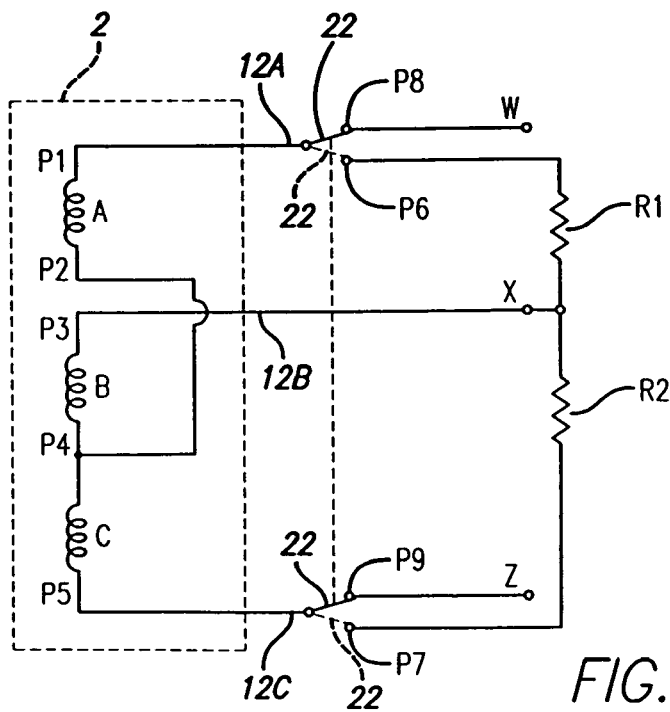
FIG. 2 is a circuit diagram showing motor coils, a switch movable from a solid line position for normal motor operation to the dashed line position for shorting the motor for passive mode vibration damping in accordance with another embodiment of the invention.
Figure 3:
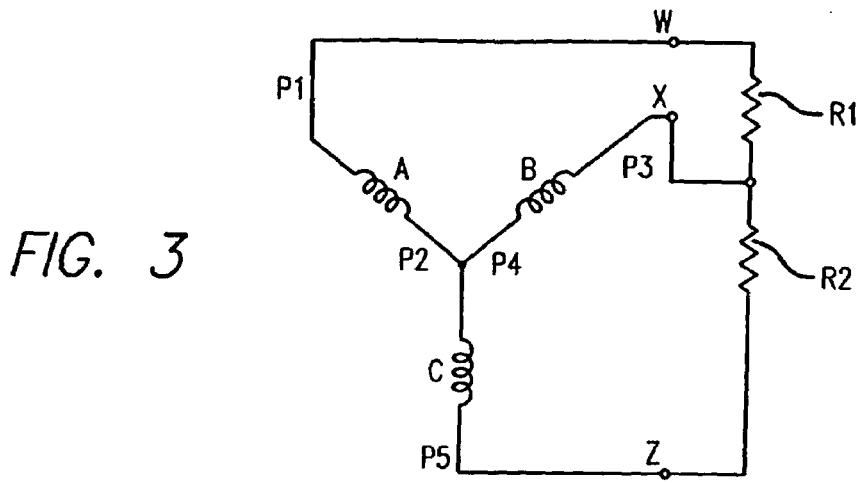
FIG. 3 shows the circuit diagram of FIG. 2 with the switch in the shorted position for passive damping.

FIG. 2 shows the circuit in solid lines before shorting and in dashed lines when shorted, while FIG. 3 shows only the circuit when shorted.

With reference to FIG. 2, motor 2 has typical three phase windings or coils A, B, C connected among points P1, P2, P3, P4 and P5 as shown. Motor drive signals 12 (FIG. 1) travel along the wires or lines 12A, 12C (FIG. 2) which connect at point P8 to point W and point P9 to point Z, and also along wire or line 12B connected to point X as shown in FIG. 2. Coils A, B, C are shown in a Y connection (but could be delta wound or other suitable connection).

With continued reference to FIG. 2, switch 22 normally connects wires 12A and 12C to points P8 and P9, respectively, during normal (active mode) operation of controller 10 (FIG. 1). Points W, X and Z and resistors R1 and R2 (FIG. 2) may be located in controller 10 (FIG. 1). As shown in FIG. 2, in the event of failure, such as a power failure or intentional turning off of power, switch 22 moves to the dashed line position to connect lines 12A and 12C to points P6 and P7, respectively, thus connecting resistors R1 and R2 to the motor windings A, B, C in the manner shown. With the circuit "shorted" in this way, power from induced currents in the motor windings A, B and C is dissipated by resistors R1, R2, and the intrinsic resistance of the motor windings; providing damping, termed passive damping because there is no power to the system. The values of resistors R1 and R2 will depend on the user's requirements, and would be readily determined by one of ordinary skill in the art.

The effectiveness of the exemplary embodiments of active and passive damping is enhanced preferably in conjunction with use of a "low inertia" motor as motor 2 of FIGS. 1 and 1A. Such a motor is especially useful in the embodiment of current feedback, and in the passive damping embodiment.

To test the preferred embodiments, various simulations were performed. Suitable commercially available simulation software may be licensed or purchased from various vendors, including The MathWorks, Inc. of Natick, Mass., sold under the name MATLAB® simulation software such as SimPower Systems 3™, SIMULINK® and/or other simulation software.

To test the invention using active force or torque feedback, a mathematical simulation was set up as is well known in the art using the conditions set forth below.

The expected resonant frequency of load 4 of FIG. 1 was taken at approximately 25 Hz. That is, system parameters were selected to achieve this resonant frequency.

Motor 2 was modeled as having 220V, a current limit of 18 amps operating at a nominal temperature of 77° F., and being a three phase Y wound motor. No velocity feedback was used. When load feedback and current feedback were used, a high pass filter of first order with a corner frequency of about 10 hertz was used.

The gear ratio (GR) was selected at 147:1, but it could be selected at almost any amount, e.g., equal to or about 50:1 or more, equal to or about 100:1 or more, or equal to or about 147:1 or more. A gear train efficiency was selected at about 71% to take frictional losses and the like into account.

Figure 6A:
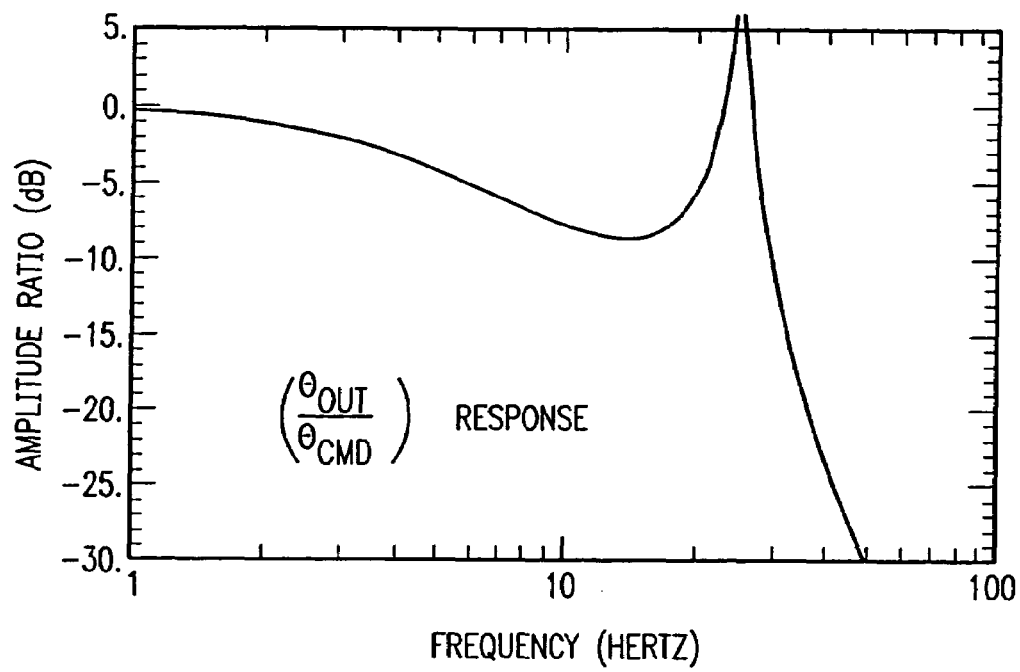
FIGS. 6A and 6B are graphs of amplitude ratio and phase angle, respectively, versus frequency showing the frequency response of a load controlled by an EMA, from position command to position response, without damping.
Figure 6B:
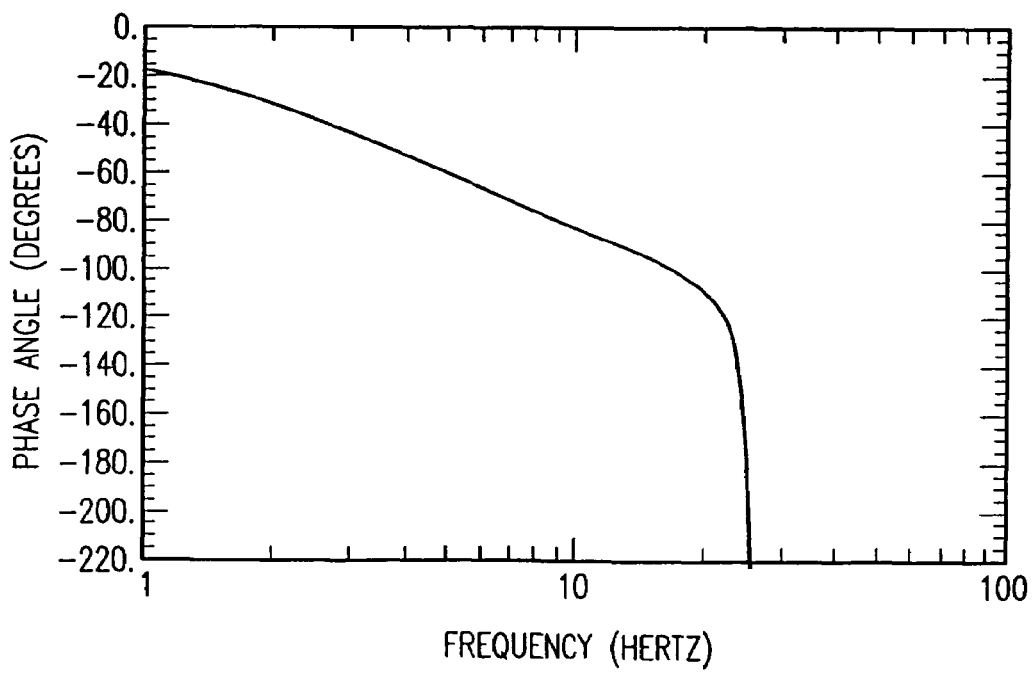
Figure 7A:
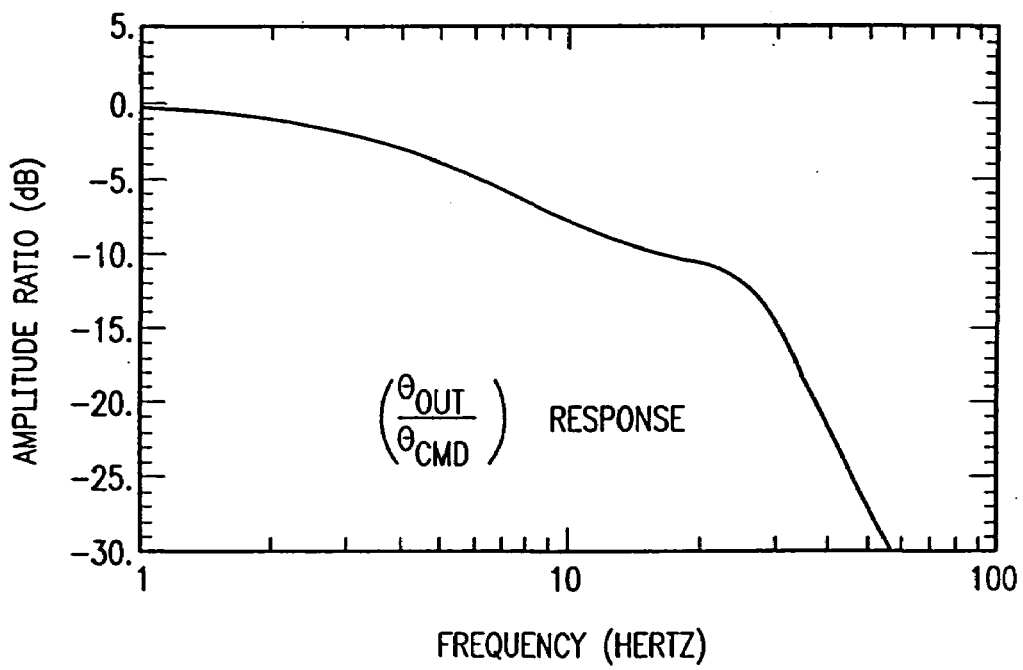
FIGS. 7A and 7B are the same graphs as FIGS. 6A and 6B, respectively, when load feedback is used in accordance with a first version of the active mode vibration damping of the invention.
Figure 7B:
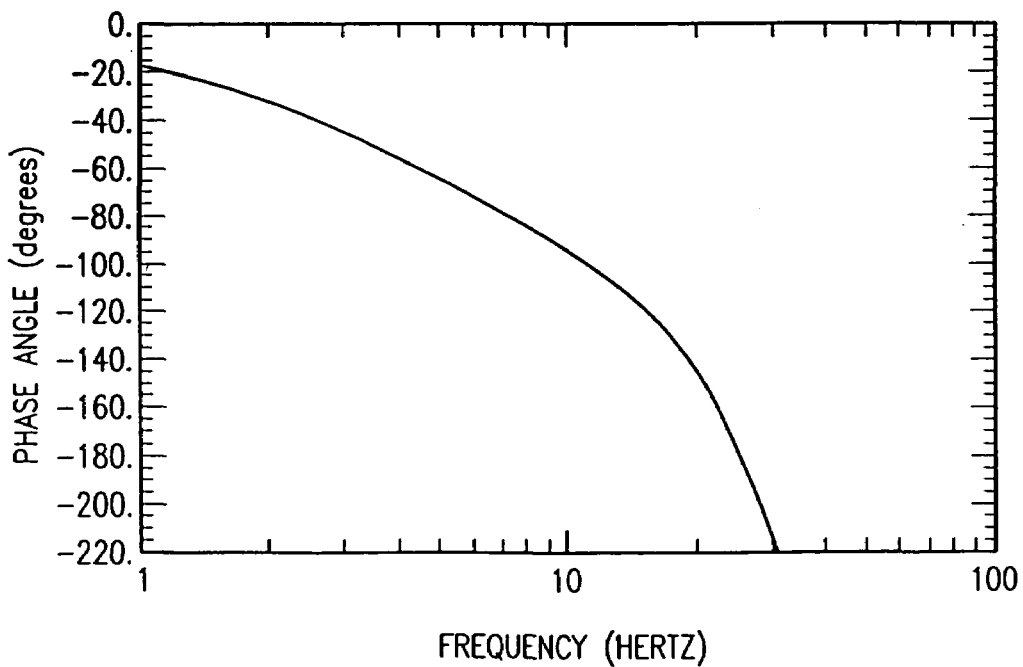

FIGS. 6A, 6B show frequency response of position response to position command with an assumed shimmy force of the nose wheel without load feedback, with a stiffness (K) (change in load divided by change in load displacement) of the system, i.e., the actuator (motor 2 with its housing), power train 6, and load 4 selected at about 300,000 in-lbf/rad. FIGS. 7A and 7B show frequency response under the same conditions, but with load feedback.

Referring to FIG. 6A, there is shown a graph of amplitude ratio in dB versus frequency in hertz. Amplitude ratio is calculated by amplitude of the signal output over amplitude of signal input, i.e., the actual angle ($\theta_{OUT}$) of the nose wheel over the commanded angle ($\theta_{CMD}$) of the wheel.

Each angle $\theta_{OUT}$ and $\theta_{CMD}$ of the nose wheel is determined relative to twelve o'clock. In this simulation, an external sinusoidal force is acting on the nose wheel or system. The amplitude ratio of the actual nose wheel angle to the commanded angle is essentially or close to zero at one hertz, meaning the system outputs essentially the same wheel angle as that commanded. As one can see from the plot, as the position command frequency increases towards the resonant frequency of a shimmying wheel, the amplitude ratio increases dramatically. As the position command frequency approaches the shimmying nose wheel resonant frequency, the nose wheel becomes very dynamically compliant causing the actual angle to become quite large in comparison with the commanded angle. That is, at approximately 25 hertz the graph spikes up.

FIG. 6B shows phase angle in degrees versus frequency for a system without feedback such as force feedback. At 25 hertz the graph is declining precipitously. This means there is a large time lag in the responsiveness of the system to a command to move the nose wheel to angle $\theta_{CMD}$.

FIG. 7A is a graph of amplitude ratio versus frequency using the same conditions as FIG. 6A, but where load feedback in accordance with the invention such as in the system of FIG. 1 is used. The load feedback gain used in this example is about 0.024 volts/in-lbf, and the corner frequency of the first-order high-pass filter in the load feedback signal is set at 10 hertz. One of skill in the art will understand that these values should be adjusted for other applications of the invention in order to optimize the damping characteristics as desired. Instead of spiking near 25 hertz, the amplitude ratio smoothly curves downward.

FIG. 7B is a graph of phase angle in degrees versus frequency using the same conditions as FIG. 6B, but where load feedback is used. FIG. 7B shows a smooth curve down instead of a precipitous decline.

Figure 8A:
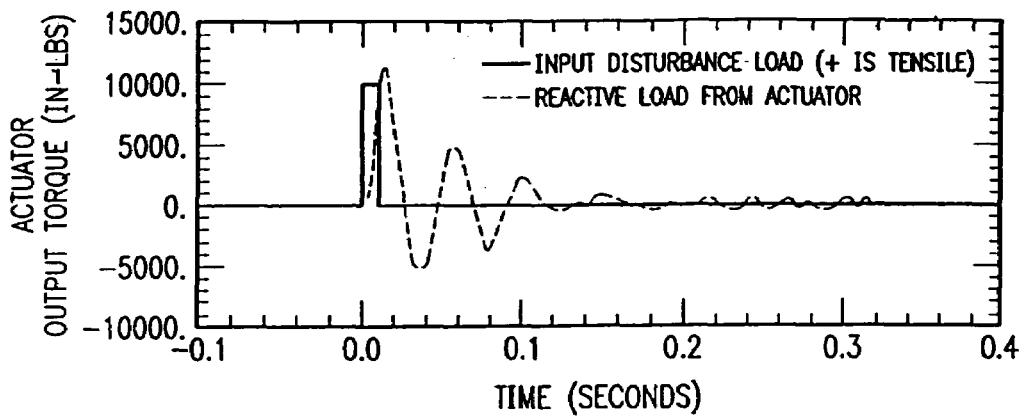
FIGS. 8A, 8B and 8C are graphs of output torque, output position and output velocity versus time, respectively, for an EMA driving a load inertia, caused by an impulse disturbance applied to the load inertia, all without any damping according to the invention.
Figure 8B:
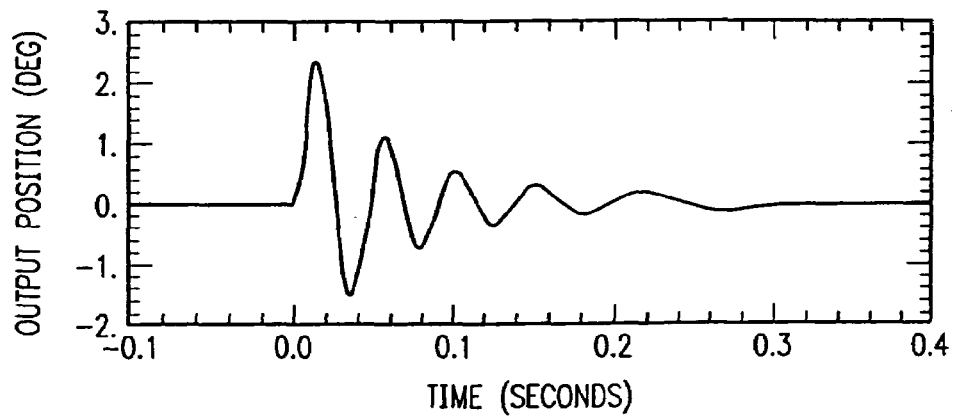
Figure 8C:
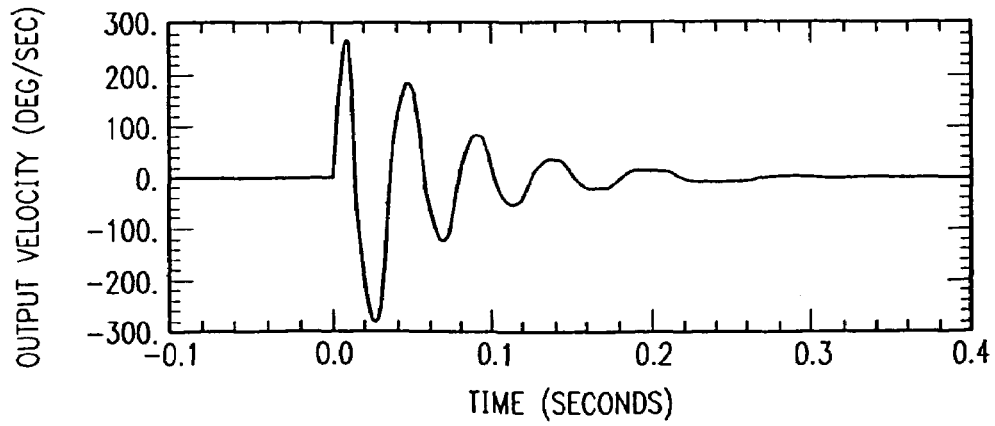

FIGS. 8A, 8B and 8C are plots showing response of the system to an impulse torque of about 10,000 in-lbs applied for about 1/100 of a second, as shown by the solid lines in FIG. 8A. The dashed lines in FIG. 8A show the output torque of the actuator in in-lbs versus time in seconds, for the case where there is no load feedback, and the actuator is active. At time equal zero (t=0), the impact of 10,000 in-lbs is applied to the nose wheel. The dashed line shows the reactive torque between the load and the actuator, which oscillates for several periods before approaching an amplitude of zero.

FIG. 8B is a graph of output position of the wheel in degrees versus time in seconds. The nose wheel position varies in a manner corresponding to the fluctuations of the actuator output torque of FIG. 8A.

FIG. 8C is a graph of output velocity in degrees per second versus time in seconds. The nose wheel is turning back and forth quickly for several cycles in a corresponding manner to the actuator output torque variations of FIG. 8A.

Figure 9A:
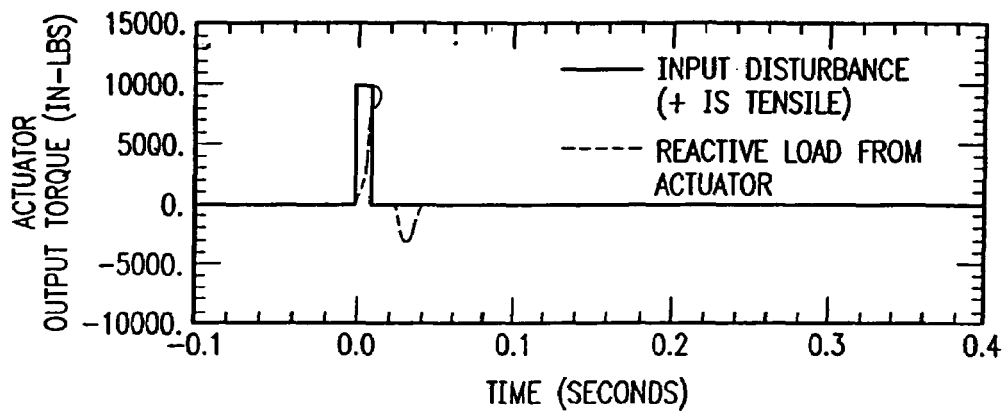
FIGS. 9A, 9B and 9C are the same type of graphs as FIGS. 8A, 8B and 8C, respectively, using active mode damping by load feedback in accordance with the first version of the invention.
Figure 9B:
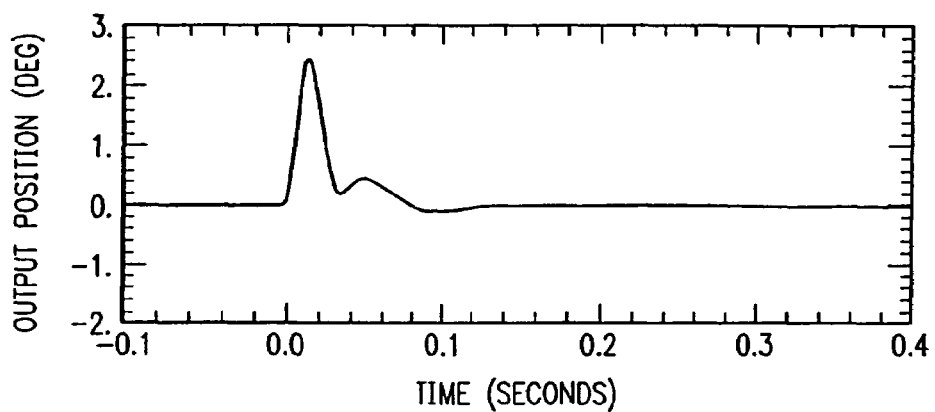
Figure 9C:
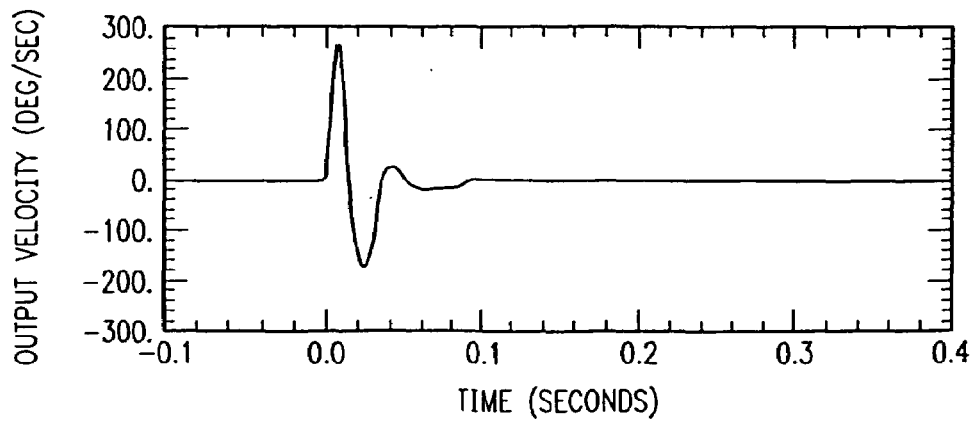

FIGS. 9A, 9B and 9C show response to the same impulse torque but with load feedback.

FIG. 9A is a graph which is the same as FIG. 8A but with load feedback in accordance with the invention. The load feedback gain used in this example is about 0.024 volts/in-lbf, and the corner frequency of the first-order high-pass filter in the load feedback signal is set at 10 hertz. One of skill in the art will understand that these values should be adjusted for other applications of the invention in order to optimize the damping characteristics as desired. The same 10,000 in-lbf momentary disturbance was applied at time zero. The dashed line showing reactive load torque at the actuator is quickly damped out. The plots of FIGS. 9B and 9C show output position versus time and output velocity versus time (similar to FIGS. 8B and 8C), respectively, with the same load feedback of FIG. 9A. FIGS. 9B and 9C show the same quick damping as FIG. 9A.

Figure 10:
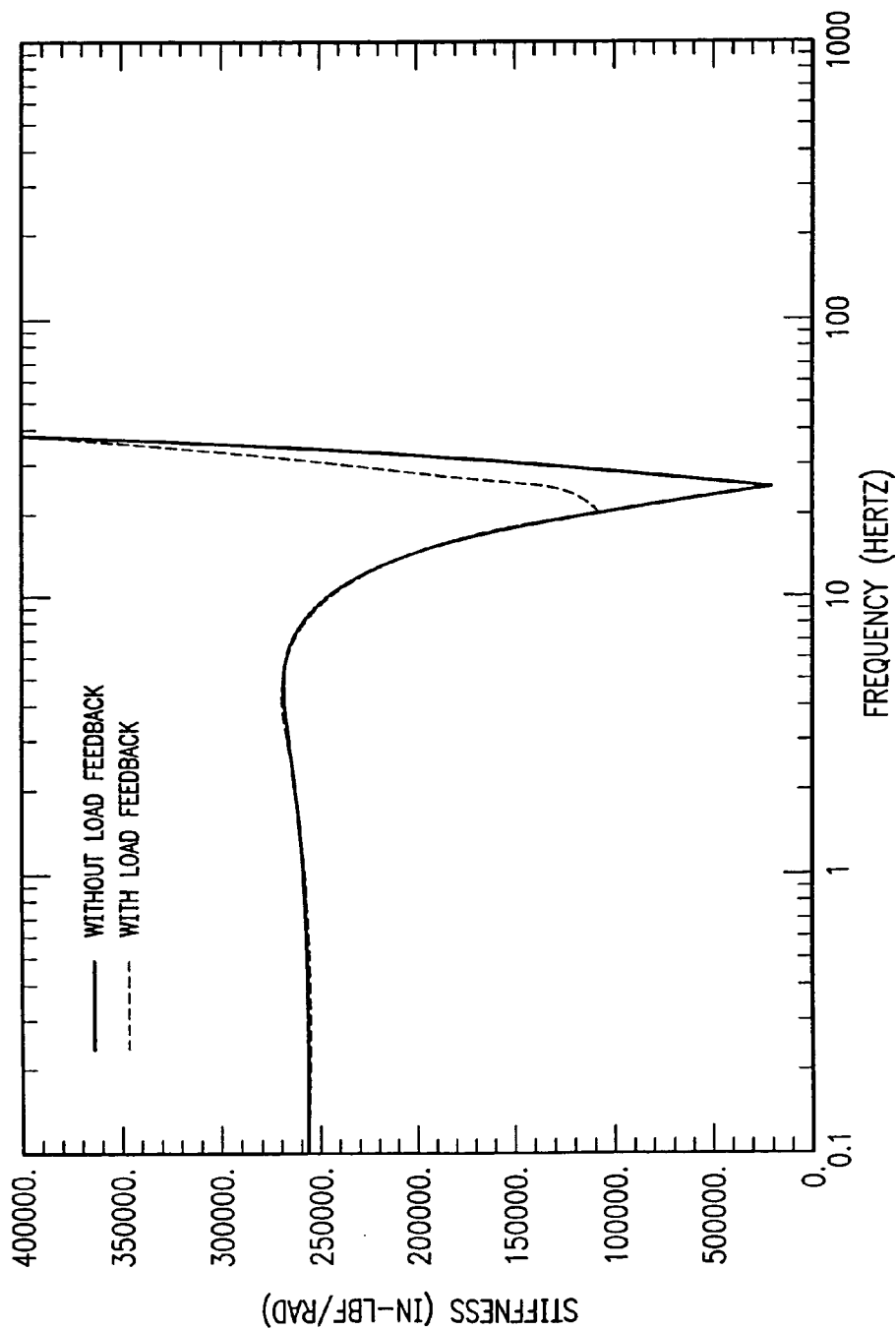
FIG. 10 is a graph of stiffness (including load inertia) versus frequency showing damping with load feedback in accordance with the first version of the invention and also without damping for comparison.

FIG. 10 is a graph of dynamic stiffness in in-lbf/rad versus frequency in hertz. It is desirable to achieve a nose wheel control that provides a large stiffness at the nose wheel. That means that it will be harder to move the nose wheel (in relation to a lower stiffness) and thus disturbances are damped quickly. The solid line represents the case where there is no load feedback and shows stiffness dipping substantially at near 25 hertz, then rising precipitously. When load feedback is used, as shown by the dashed line, the stiffness drops much less dramatically when nearing 25 hertz and even begins to rise again before 25 hertz.

Figure 11A:
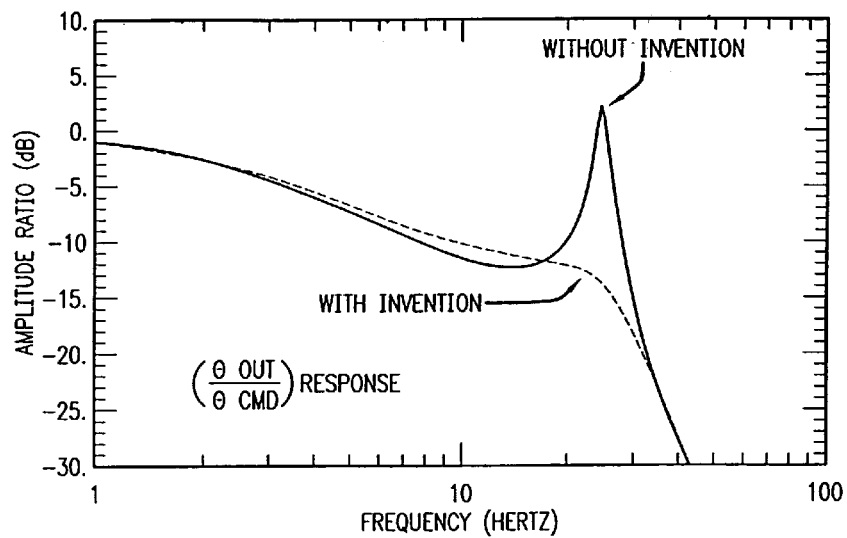
FIGS. 11A and 11B are graphs of amplitude ratio versus frequency and phase angle versus frequency, respectively, for comparing frequency response for a conventional electric motor and load without any damping (in a solid line) and for a low inertia electric motor with damping (in a dashed line) in accordance with a second version of the active mode damping of the first embodiment of the invention, using current feedback.
Figure 11B:
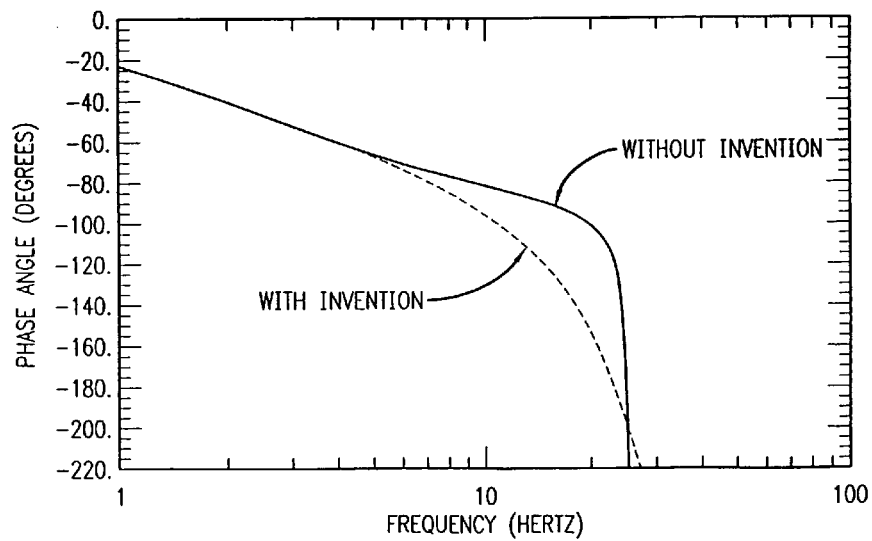

FIGS. 11A and 11B are graphs like those shown in FIGS. 6A, 6B and 7A, 7B, with the same conditions, except as indicated below. In FIGS. 11A and 11B, the dashed line is for the embodiment where current feedback and a low inertia motor (3.5:1) are used. The solid line is where there is no current feedback, and a regular stator to rotor diameter ratio of about 2:1 is used in the motor. As one can see again from these graphs, as the frequency increases towards the resonant frequency, the amplitude ratio increases (without current feedback and without the low inertia motor). The results, similar to those in FIGS. 6A, 6B, and 7A, 7B, show that the damping using an embodiment of the invention is significantly improved over the simulations without using an embodiment of the invention.

Figure 12A:
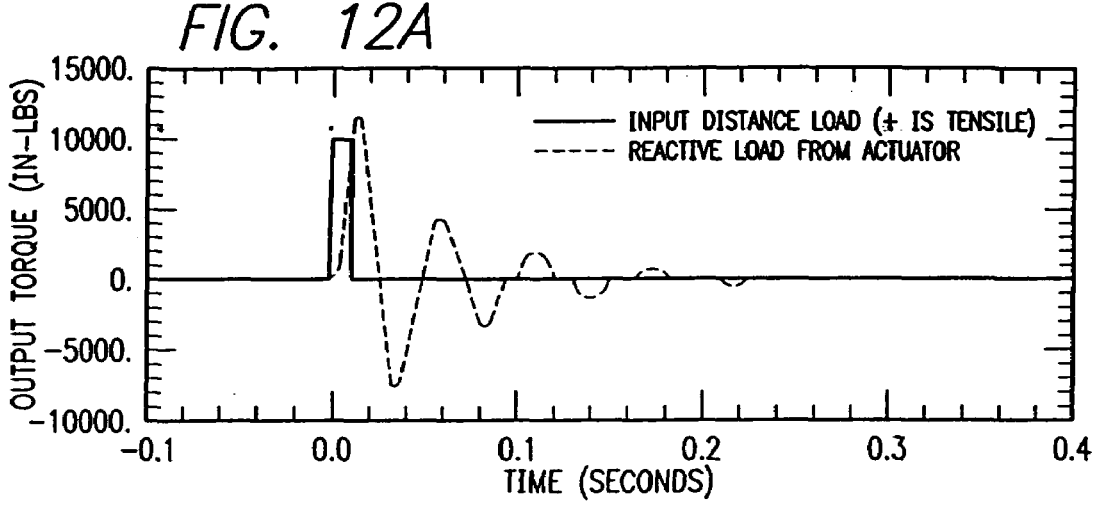
FIGS. 12A, 12B and 12C are graphs of output torque of an EMA versus time, output position versus time, and motor current versus time, respectively, all without any damping according to the invention.
Figure 12B:
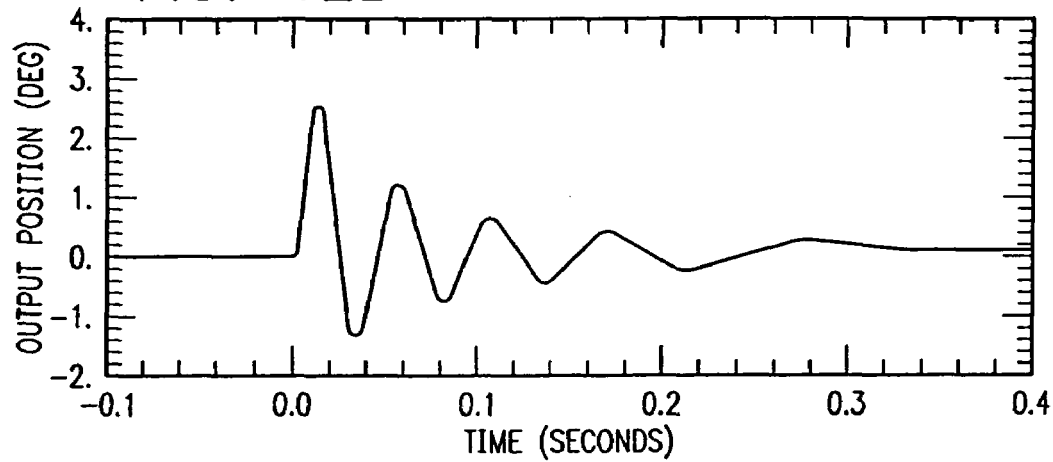
Figure 12C:
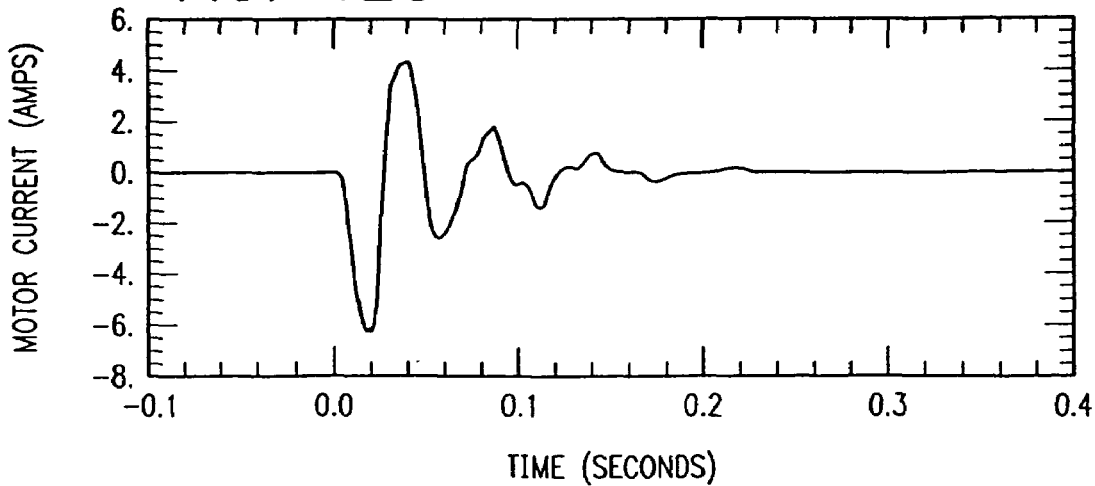

FIGS. 12A and 12B are the same type of plots as FIGS. 8A and 8B, respectively, showing in various ways the response of the system to the same 10,000 in-lbf impulse force as applied in FIGS. 8A and 8B where the system does not use any current feedback and uses a regular stator to rotor diameter ratio of about 2:1 in the motor. FIG. 12C is a plot of motor current in amps versus time under the same conditions as FIGS. 12A and 12B. The results in FIGS. 12A, 12B and 12C all show relatively slow damping out of the disturbance.

Figure 13A:
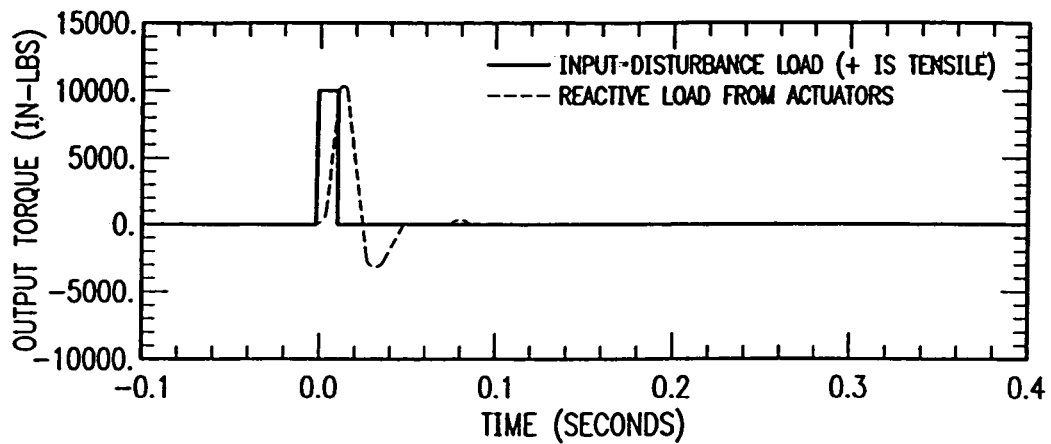
FIGS. 13A, 13B and 13C are graphs of the same type as in FIGS. 12A, 12B and 12C, respectively, using active mode damping but using current feedback and a low inertia motor in a second version of the active mode damping of the first embodiment of the invention.
Figure 13B:
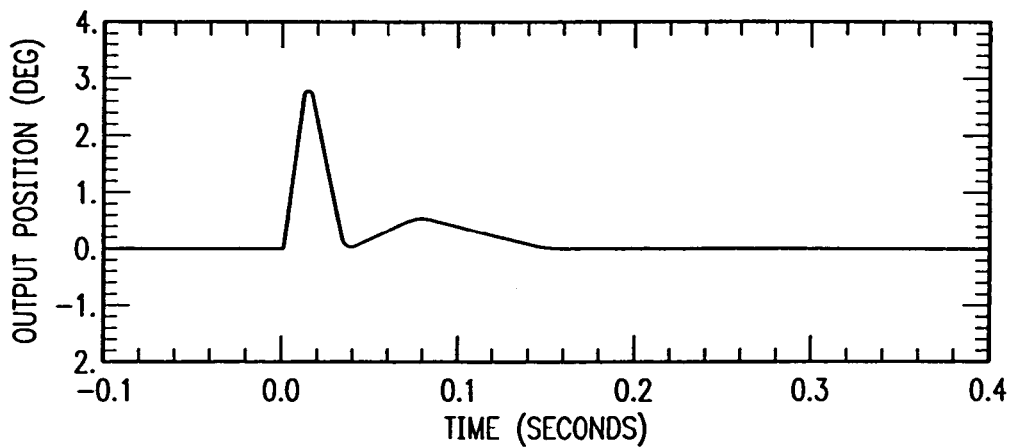
Figure 13C:
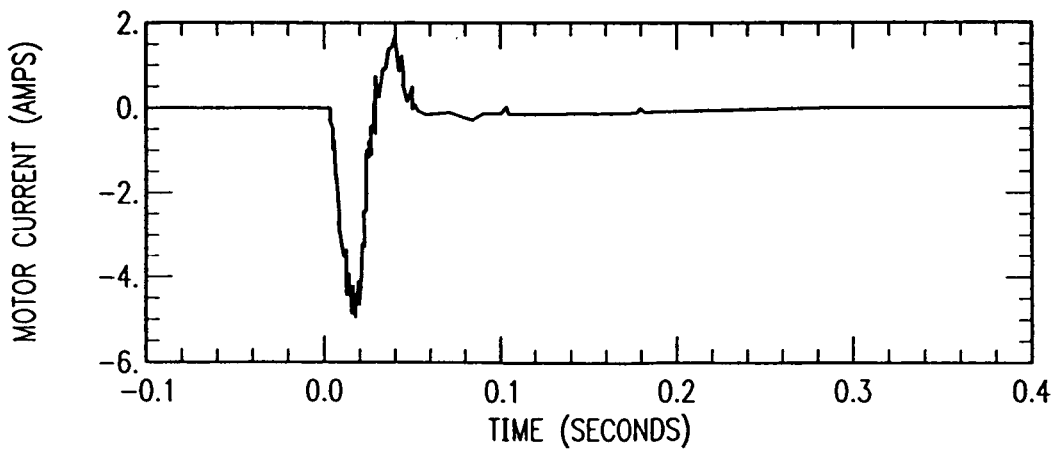

FIGS. 13A, 13B and 13C are the same type of plots as in FIGS. 12A, 12B and 12C, respectively, but with current feedback and a low inertia motor (3.5:1) in accordance with an embodiment of the invention used in the simulations of FIGS. 11A and 11B. The effects of the impulse are quickly damped relative to the effects in FIGS. 12A, 12B and 12C, respectively.

Figure 14A:
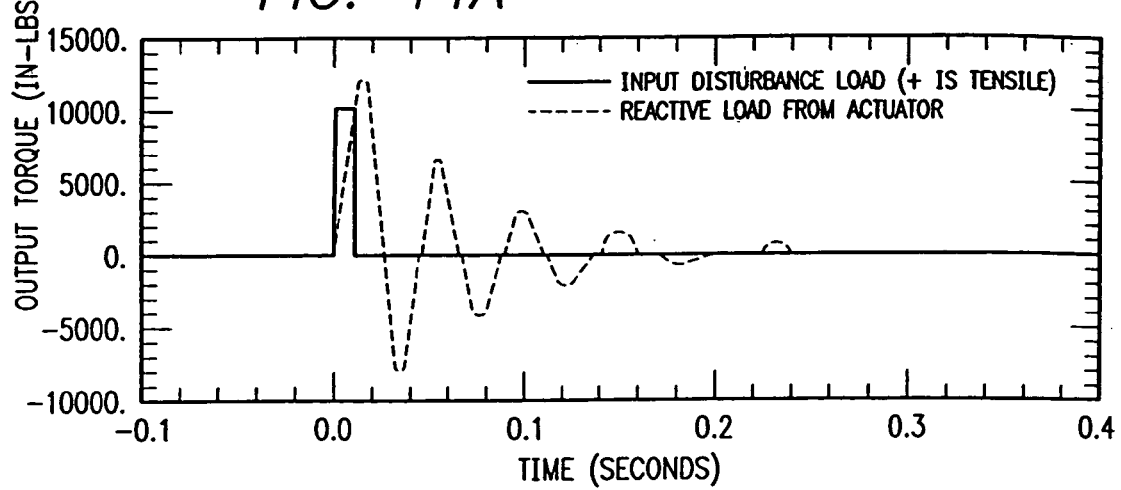
FIGS. 14A, 14B and 14C are graphs of the same type as FIGS. 13A, 13B and 13C, respectively, with current feedback but without using a low-inertia motor.
Figure 14B:
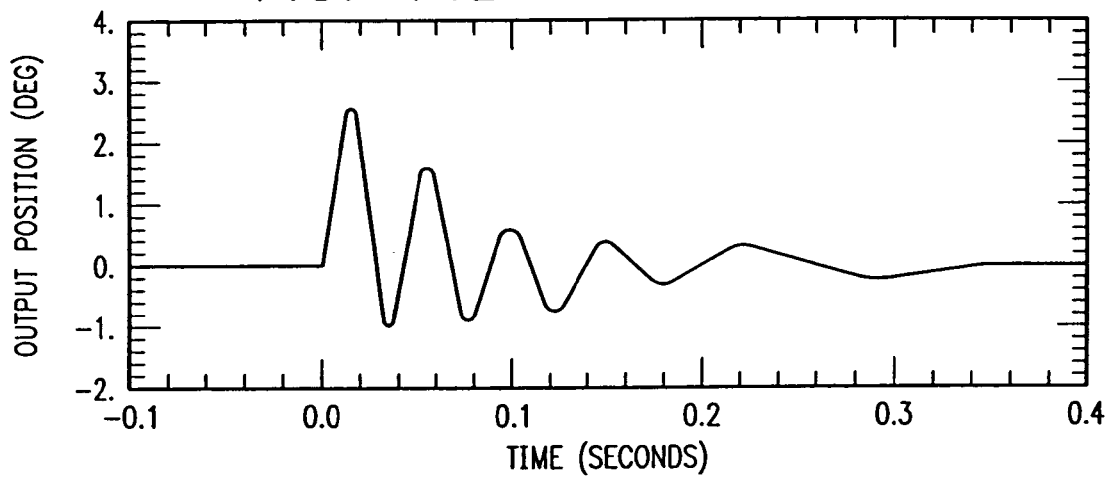
Figure 14C:
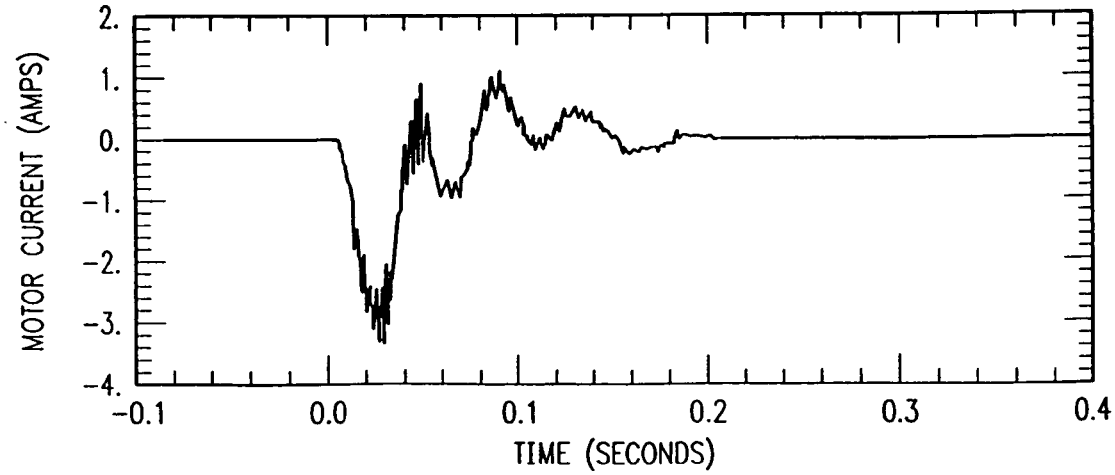

FIGS. 14A, 14B and 14C are the same type of graphs as FIGS. 13A, 13B and 13C but using a motor having a stator to rotor ratio of about 2:1, instead of a low inertia motor. Even with current feedback, the effect of the input disturbance is not damped out for several cycles.

Figure 15:
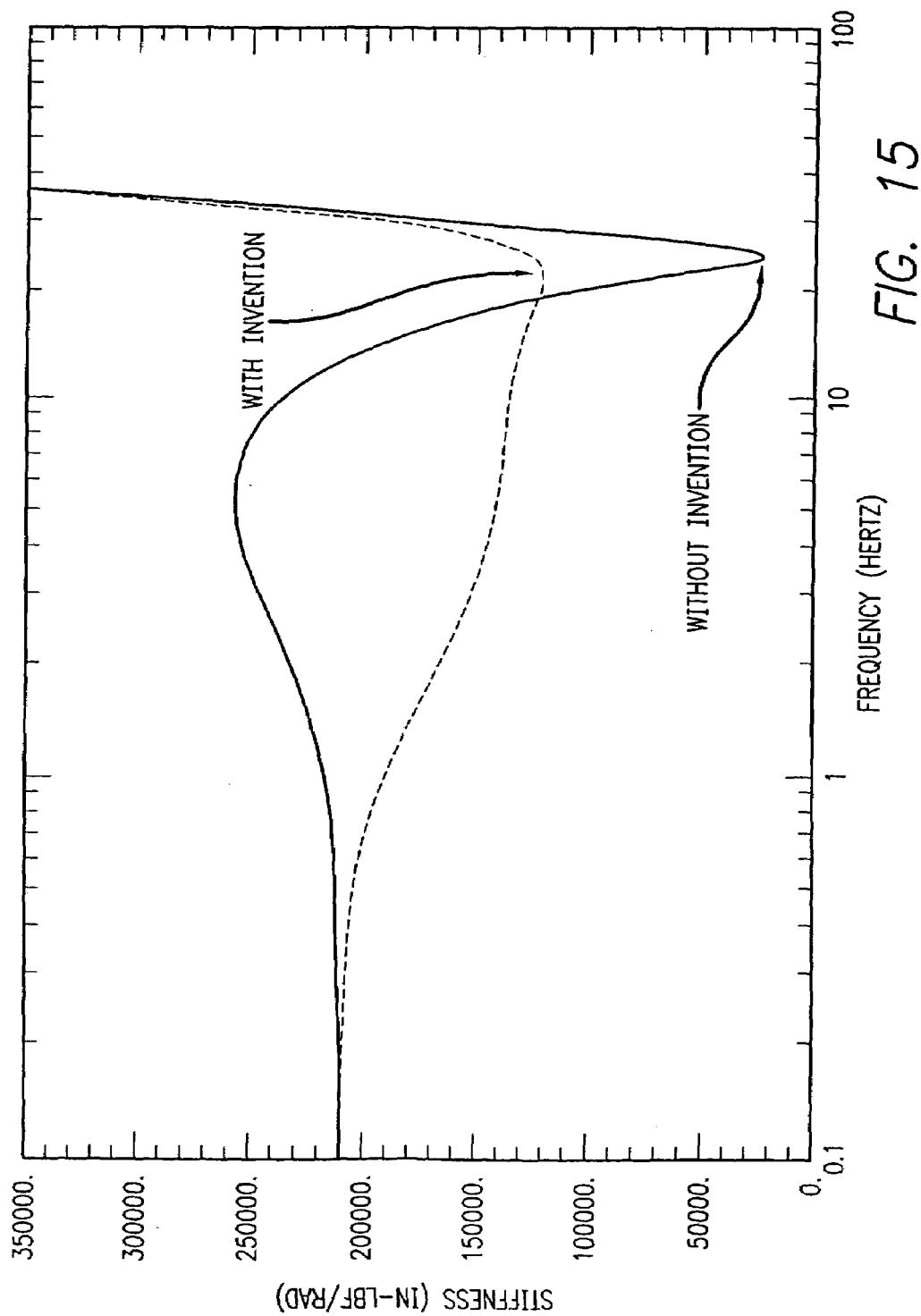
FIG. 15 is a graph of stiffness (including load inertia) versus frequency showing (in a dashed line) damping with current feedback and a low inertia motor in accordance with the second version of the first embodiment of the invention, and (in a solid line) without damping and with a conventional electric motor.

FIG. 15 is a graph of dynamic stiffness in in-lbf/rad versus frequency in hertz similar to FIG. 10. The plot shows stiffness dipping substantially at near 25 hertz, then rising precipitously, in the solid line where current feedback and a low inertia motor are not used (same conditions as FIGS. 11A and 11B in the "without invention" simulation). By contrast, as shown by the dashed line, when current feedback and a low inertia motor are used (same conditions as in FIGS. 11A and 11B in the "with invention" simulation), the stiffness does not dip as dramatically near 25 hertz.

Although the invention has been described using specific terms, devices, and/or methods, such description is illustrative of the preferred embodiment(s) only. Changes may be made to the preferred embodiment(s) by those of ordinary skill in the art without departing from the scope of the present invention as set forth in the claims. Aspects of the preferred embodiment(s) generally may be interchanged in whole or in part.

What is claimed is:

1. A damped system for moving a load, comprising:
   an electric motor having damping means;
   a mechanical connection between the electric motor and the load;
   a transducer to sense an indicator related to load force or torque and produce a feedback signal; and
   a controller connected to the electric motor and providing a motor control signal to move the load to a desired position, and connected to the transducer for receiving the feedback signal and adjusting the motor control signal based on the feedback signal whereby disturbances to the position of the load are damped;
   wherein the damping means comprises a resistance and a switch for connecting the motor windings in a short circuit with the resistance in response to loss of power to the motor, whereby oscillating disturbances to the position of the load are damped even when there is no power to the motor.

2. The damped system of claim 1, wherein the electric motor is a servo motor comprising an electromagnetic actuator.

3. The damped system of claim 1, wherein the transducer is one of a force transducer, a torque transducer, and an accelerometer.

4. The damped system of claim 3, further comprising a high pass filter which filters the feedback signals.

5. The damped system of claim 1, wherein the transducer is a current sensor.

6. The damped system of claim 5, wherein the electric motor has a stator and a rotor, and a diameter of the stator divided by a diameter of the rotor is set for damping to at least 2.75.

7. The damped system of claim 6, wherein the diameter of the stator divided by the diameter of the rotor is at least about five.

8. The damped system of claim 6, wherein the diameter of the stator divided by the diameter of the rotor is at least about ten.

9. The damped system of claim 1, wherein the resistance comprises two resistors.

10. The damped system of claim 1, wherein the resistance comprises three resistors.

11. The damped system of claim 1, wherein the motor comprises a stator and a rotor, and the feedback means further includes setting the diameter of the stator divided by a diameter of the rotor equal to at least about 2.75.

12. The damped system of claim 11, wherein the diameter of the stator divided by the diameter of the rotor is at least about five.

13. The damped system of claim 11, wherein the diameter of the stator divided by the diameter of the rotor is at least about ten.

14. The damped system of claim 1, wherein the mechanical connection includes a power train which has a gear ratio of at least about fifty.

15. The damped system of claim 1, wherein the load comprises a front wheel of a vehicle.

16. The damped system of claim 1, wherein the electric motor forms at least a portion of an electromechanical actuator which is configured to stabilize the mechanical connection at a fixed orientation when the load is coupled to the mechanical connection and when the load is moved to the desired position, the disturbances being damped when the electromechanical actuator stabilizes the mechanical connection at the fixed orientation.

17. The damped system of claim 1, wherein the electromechanical actuator is configured to stabilize the mechanical connection at a fixed orientation when the load is coupled to the mechanical connection and when the load is moved to the desired position, the disturbances being damped when the electromechanical actuator stabilizes the mechanical connection at the fixed orientation.

18. A damped system for moving a load, comprising:
an electric motor having damping means;
a mechanical connection between the electric motor and the load;
a transducer to sense an indicator related to load force or torque and produce a feedback signal; and
a controller connected to the electric motor and providing a motor control signal to move the load to a desired position, and connected to the transducer for receiving the feedback signal and adjusting the motor control signal based on the feedback signal whereby disturbances to the position of the load are damped;
wherein the electric motor has a stator and a rotor, and wherein a diameter of the stator divided by a diameter of the rotor is set for damping, the ratio being set at least 2.75.

19. The damped system of claim 18, wherein the diameter of the stator divided by the diameter of the rotor is at least about five.

20. The damped system of claim 18, wherein the ratio of the diameter of the stator divided by the diameter of the rotor is at least about ten.

21. A method of providing damping to disturbances to the position of a load in a load moving system, the method comprising the steps of:
moving a load with an electric motor;
sensing an indicator of load movement and feeding back a feedback signal indicative of the sensed indicator; and
controlling the electric motor by providing a motor control signal to move the load to a desired position based on the feedback signal, whereby disturbances to the position of the load are damped;
wherein the motor has windings, and the method further comprises a step of providing a resistance, and a step of connecting the motor windings in a short circuit with the resistance in response to loss of power to the motor, whereby disturbances to the position of the load are damped even when there is no power to the motor.

22. The method of claim 21, wherein the electric motor forms at least a portion of an electromechanical actuator which is configured to stabilize a mechanical connection at a fixed orientation when the load is coupled to the mechanical connection and when the load is moved to the desired position, and wherein the step of controlling the electric motor includes the step of:
damping the disturbances when the electromechanical actuator stabilizes the mechanical connection at the fixed orientation.

23. A damped system for moving a load, comprising:
an electromagnetic actuator;
a mechanical connection between the electromagnetic actuator and the load;
a controller connected to the electromagnetic actuator and providing a motor control signal to move the load to a desired position; and
a damping mechanism electrically responsive to an indicator related to force or torque oscillations of the load from the desired position in response to disturbances to the position of the load;
wherein the electromagnetic actuator comprises an electrical motor having windings, and the damping mechanism comprises a resistance, and a switch for connecting the motor windings in a short circuit with the resistance in response to loss of power to the motor whereby disturbances to the position of the load are damped even when there is no power to the motor.

24. The damped system of claim 23, wherein the damping mechanism further comprises a transducer to sense an indicator related to load force or torque oscillations, and produce a feedback signal, and the controller is also connected to the transducer for receiving the feedback signal and adjusting the control signal to the motor based on the feedback signal whereby disturbances to the position of the load are damped.

* * * * *